US009724919B2

(12) United States Patent
Hirayama et al.

(10) Patent No.: US 9,724,919 B2
(45) Date of Patent: Aug. 8, 2017

(54) PRINTING ELEMENT SUBSTRATE, PRINTHEAD, AND PRINTHEAD MANUFACTURING METHOD

(75) Inventors: Nobuyuki Hirayama, Fujisawa (JP); Ryo Kasai, Tokyo (JP); Kengo Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 13/327,954

(22) Filed: Dec. 16, 2011

(65) Prior Publication Data

US 2012/0162317 A1 Jun. 28, 2012

(30) Foreign Application Priority Data

Dec. 27, 2010 (JP) ................................ 2010-290660
Dec. 8, 2011 (JP) ................................ 2011-269398

(51) Int. Cl.
*B21D 53/76* (2006.01)
*B23P 17/00* (2006.01)
(Continued)

(52) U.S. Cl.
CPC ............. *B41J 2/155* (2013.01); *B41J 2/0458* (2013.01); *B41J 2/04506* (2013.01);
(Continued)

(58) Field of Classification Search
CPC ...... B41J 2/1603; B41J 2/1626; B41J 2/1631; B41J 2/1623
(Continued)

(56) References Cited

U.S. PATENT DOCUMENTS 5,265,315 A * 11/1993 Hoisington et al. ......... 29/25.35
5,446,484 A * 8/1995 Hoisington et al. ............ 347/68
(Continued)

FOREIGN PATENT DOCUMENTS

CN 101722729 A 6/2010
EP 1 231 059 A2 8/2002
(Continued)

OTHER PUBLICATIONS

Notification of First Office Action dated Dec. 3, 2013, in Chinese Application No. 201110444499.1.

*Primary Examiner* — Paul D. Kim
(74) *Attorney, Agent, or Firm* — Fitzpatrick, Cella, Harper & Scinto

(57) ABSTRACT

A printhead manufacturing method includes preparing a printing element substrate including a receiver, first and second input pads, and plural selection pads, and preparing a head substrate including first and second transmission lines. The receiver includes first and second terminals for receiving signals, and the first and second input pads are connected to the first and second terminals, respectively, and the plural selection pads connected to the second terminal via at least two from among plural resistive elements to selectively obtain one of plural combined resistances. At least one of the plural selection pads is selected to be connected to the first transmission line to obtain a value of the one of the plural combined resistances. The selected selection pad is connected to the first transmission line, the first input pad is connected to the first transmission line, and the second input pad is connected to the second transmission line.

3 Claims, 16 Drawing Sheets

(51) Int. Cl.

| | |
|---|---|
| ***B41J 2/135*** | (2006.01) |
| ***B41J 2/155*** | (2006.01) |
| ***B41J 2/045*** | (2006.01) |
| ***B41J 2/14*** | (2006.01) |

(52) U.S. Cl.
CPC ....... *B41J 2/04541* (2013.01); *B41J 2/14072* (2013.01); *B41J 2202/20* (2013.01); *Y10T 29/49401* (2015.01)

(58) Field of Classification Search
USPC ..................................... 29/890.1; 347/44, 45
See application file for complete search history.

(56) References Cited

U.S. PATENT DOCUMENTS

| | | | | |
|---|---|---|---|---|
| 5,767,872 | A * | 6/1998 | Scardovi et al. | 347/17 |
| 6,103,072 | A * | 8/2000 | Nishiwaki et al. | 204/192.18 |
| 6,290,331 | B1 * | 9/2001 | Agarwal et al. | 347/47 |
| 6,705,708 | B2 * | 3/2004 | Murai | 347/70 |
| 6,824,257 | B2 * | 11/2004 | Silverbrook | 347/85 |
| 6,895,645 | B2 * | 5/2005 | Xu et al. | 29/25.35 |
| 6,964,201 | B2 * | 11/2005 | Xu et al. | 73/794 |
| 7,036,913 | B2 * | 5/2006 | Kim et al. | 347/56 |
| 7,089,635 | B2 * | 8/2006 | Xu et al. | 29/25.35 |
| 7,290,867 | B2 * | 11/2007 | Kobayashi et al. | 347/71 |
| 8,359,748 | B2 * | 1/2013 | Xu et al. | 29/890.1 |
| 2004/0179064 | A1 * | 9/2004 | Zapka et al. | 347/47 |
| 2009/0073242 | A1 * | 3/2009 | Xu et al. | 347/71 |
| 2011/0214812 | A1 * | 9/2011 | Song et al. | 156/345.33 |
| 2012/0033017 | A1 * | 2/2012 | Iwanaga et al. | 347/54 |

FOREIGN PATENT DOCUMENTS

| | | | |
|---|---|---|---|
| JP | 9-11473 | A | 1/1997 |
| JP | 2007-296638 | A | 11/2007 |
| JP | 2010-284813 | A | 12/2010 |

* cited by examiner

PRINTING ELEMENT SUBSTRATE, PRINTHEAD, AND PRINTHEAD MANUFACTURING METHOD

BACKGROUND OF THE INVENTION

Field of the Invention

The present invention relates to a printing element substrate including a printing element which forms information such as a character or figure on a printing medium such as paper or cloth, a printhead including the printing element substrate, and a printhead manufacturing method.

Description of the Related Art

To meet a demand for a higher printing speed in inkjet printers, there has been proposed a line head configured by arranging a plurality of printing element substrates in a predetermined direction at the same width as the width (to be referred to as printing width) of a printing medium. This printhead is fixed and can print simultaneously at the printing width, achieving higher-speed printing than by a serial printer which prints by reciprocating the printhead. Japanese Patent Laid-Open No. 2007-296638 (to be referred to as a literature) discloses an example of the structure of the line head.

FIG. 1 in the literature shows the outer appearance of a printhead after assembly. FIG. 3 in the literature is an exploded view of the printhead shown in FIG. 1.

Referring to FIGS. 1 and 3 in the literature, a plurality of printing element substrates H1100*a* to H1100*d* are arranged in a predetermined direction on a first plate H1200, and electrically connected to an electrical wiring board H1300 by wire bonding or the like. A printer main body supplies power and control signals to the printing element substrates H1100 via an external signal input terminal H1301 arranged on the electrical wiring board H1300.

FIG. 9 in the literature shows signal wiring between the four printing element substrates H1100*a* to H1100*d*. Signals HEAT1 to HEAT8 and IDATA1 to IDATA8 are individually supplied from the respective printing element substrates to external signal input terminals. HEAT1 to HEAT8 are pulse signals to be supplied to printing elements on the respective printing element substrates. IDATA1 to IDATA8 are data signals for selecting desired printing elements on the respective printing element substrates in synchronism with DCLK. FIG. 10 in the literature shows the timings of respective signals.

The line head type printhead can print on a wider printing medium by increasing the number of printing element substrates arranged along the printing width. However, as the number of printing element substrates increases, the number of input terminals of the line head also increases. Also when implementing higher-resolution printing of photographic quality by the line head, it is effective to increase the printing element density with respect to the printing width on the printing element substrate or increase the number of printing element arrays along the printing width. In this case, the number of printing elements per printing element substrate increases. A larger number of printing elements leads to a larger number of data to be input to the printing element substrate. To cope with a larger number of data without decreasing the printing speed, the data transfer speed needs to be increased. When the wiring from the head input terminal to the printing element substrate becomes long, like the line head, the waveform may deteriorate midway along the wiring or data may be garbled by external noise entering the wiring. This makes high-speed data transfer difficult.

To solve this problem, a low voltage differential signaling (LVDS) scheme is effective. FIG. 14 is a circuit diagram exemplifying the transmitting and receiving sides according to the related LVDS scheme.

As shown in FIG. 14, in LVDS data transfer, a transmitter 1401 on the transmitting side outputs a signal as a current, and a receiver 1402 on the receiving side converts the input current into a voltage. To transfer data quickly without distorting the data transfer waveform, impedances on the transmitting and receiving sides desirably match each other, and the receiving end requires a terminating resistance element.

When impedances on the data transmission line and the terminating resistance element at the receiving end match each other, the data transfer waveform becomes a waveform as shown in FIG. 15A. If impedances on the line and terminating resistance element do not match each other, the data transfer waveform distorts owing to reflection, as shown in FIG. 15B, inhibiting high-speed data transfer. To avoid the impedance mismatch, an external resistive element having a guaranteed resistance is effectively mounted near the receiving end.

However, it is difficult to mount a component such as the resistive element near the end of the printing element substrate of the printhead in terms of reliability and maintenance due to requests for insulation of the resistive element from ink and flatness of the head surface when wiping ink from the head surface. As the terminating resistance element, a printing element formed on a printing element substrate by a semiconductor process may be used. Such a printing element substrate is manufactured using a semiconductor manufacturing process, and many printing element substrates are fabricated at once from one silicon wafer. Printing element substrates obtained by the semiconductor manufacturing process vary in the resistance of the resistive element by 20 to 30% under the influence of manufacturing variations. Therefore, even if the resistive element is arranged, some printing element substrates may generate an impedance mismatch to distort the data transfer waveform, failing high-speed data transfer again.

To reduce such manufacturing variations, there is known a method of trimming a resistive element by a laser or the like to adjust the resistance to a predetermined value. However, this method raises the manufacturing cost. In addition, if the laser damages the substrate surface, insulation of the resistive element from ink may be impaired, resulting in poor reliability.

SUMMARY OF THE INVENTION

The present invention provides a high-reliability printing element substrate, printhead, and printhead manufacturing method capable of suppressing deterioration of the transmission waveform caused by an impedance mismatch and transferring data quickly without using an external terminating resistance element.

According to a first aspect of the present invention there is provided a printhead manufacturing method comprising the steps of: preparing a printing element substrate including a receiver including a first terminal and second terminal which receive a first signal and second signal of differential signals, respectively, a first input pad which is connected to the first terminal and externally receives the first signal, a second input pad which is connected to the second terminal and externally receives the second signal, and a plurality of selection pads which are connected to the second terminal via at least two resistive elements out of a plurality of printing elements to obtain combined resistances different from each other; preparing a head substrate including a first transmission line which transmits the first signal, and a second transmission line which transmits the second signal; selecting one of the plurality of selection pads to be connected to the first transmission line in accordance with values of the combined resistances; and connecting at least one of the plurality of selection pads selected in the selection step and the first transmission line, connecting the first input pad and the first transmission line, and connecting the second input pad and the second transmission line.

According to a second aspect of the present invention there is provided a printing element substrate comprising: a receiver including a first terminal and second terminal which receive a first signal and second signal of differential signals, respectively; a first input pad which is connected to the first terminal and externally receives the first signal; a second input pad which is connected to the second terminal and externally receives the second signal; and a variable resistance section which is arranged to adjust a resistance between the first terminal and the second terminal, and includes a plurality of selection pads which are connected to the second terminal via at least two resistive elements out of a plurality of printing elements, wherein when the first signal is externally input to at least one of the plurality of selection pads and the first input pad and the second signal is input to the second input pad, a combined resistance by the plurality of resistive elements is set between the first terminal and the second terminal.

According to a third aspect of the present invention there is provided a printhead comprising: the above described printing element substrate; and a head substrate including a first transmission line which is connected to a first input pad and transmits a first signal to the first input pad, and a second transmission line which is connected to a second input pad and transmits a second signal to the second input pad, wherein at least one selection pad out of a plurality of selection pads is connected to the first transmission line.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1A:
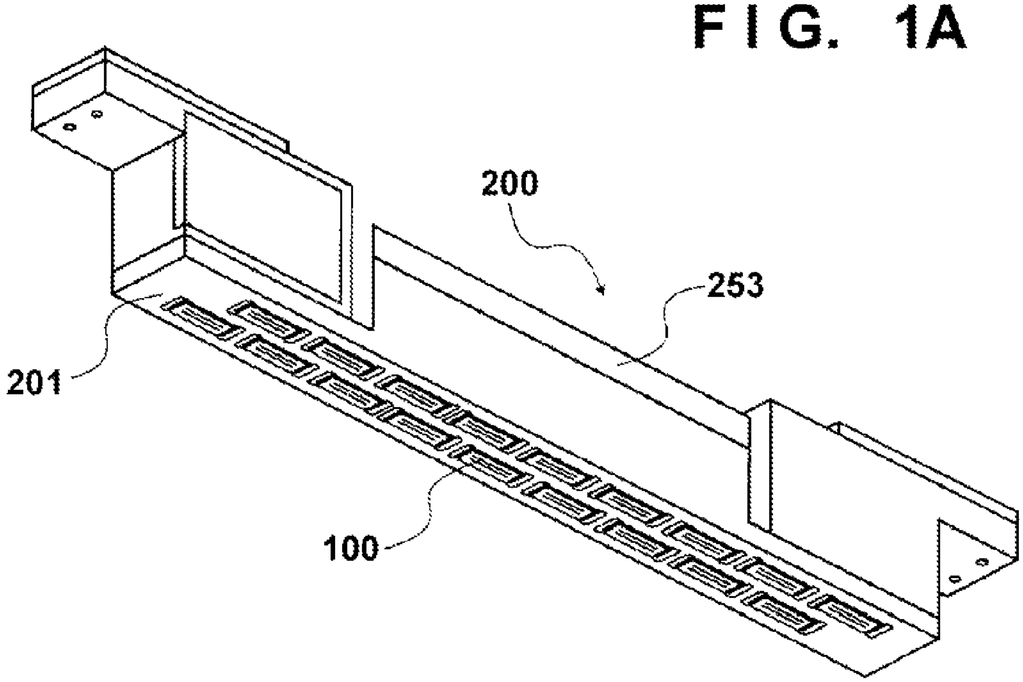
FIGS. 1A and 1B are perspective views exemplifying the outer appearance of a printhead in the first embodiment.
Figure 1B:
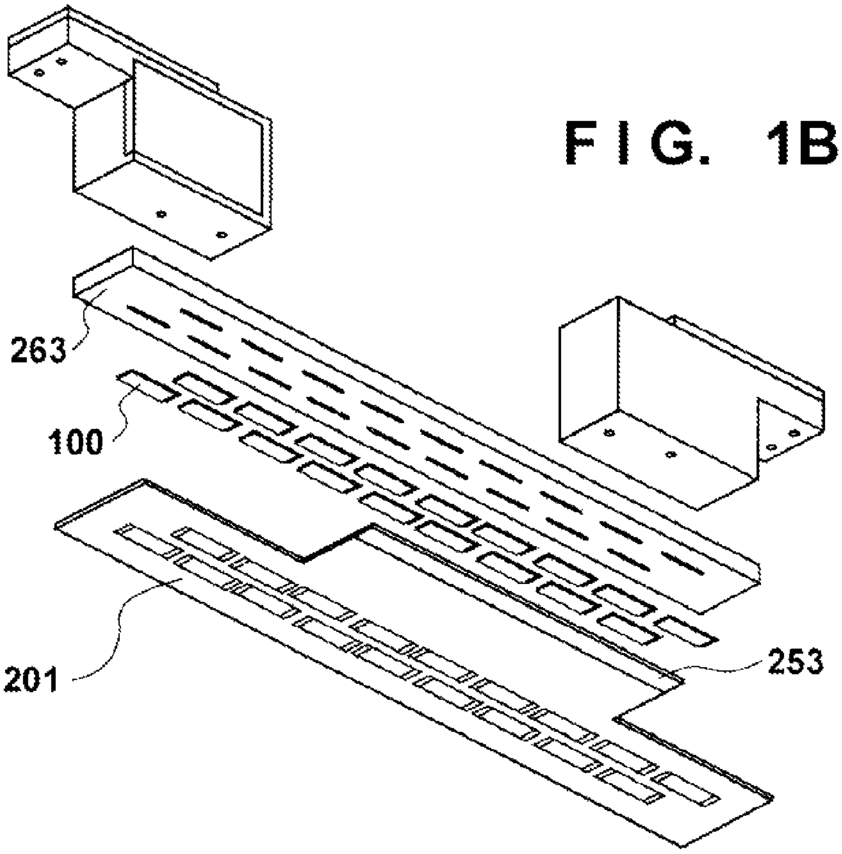

The arrangement of a printhead according to the first embodiment will be described. FIGS. 1A and 1B are perspective views exemplifying the outer appearance of a printhead in the first embodiment. FIG. 1B is an exploded perspective view showing the outer appearance of the printhead shown in FIG. 1A.

As shown in FIGS. 1A and 1B, a printhead 200 includes a supporting member 263 and head substrate 201. A plurality of printing element substrates 100 are arranged in a predetermined direction on the supporting member 263. The head substrate 201 includes a connection electrode 253. A plurality of printing element substrates 100 are electrically connected to the connection electrode 253 of the head substrate 201 by wire bonding or the like. A printer main body (not shown) supplies power and control signals to the printing element substrates 100 via the connection electrode 253.

Figure 2:
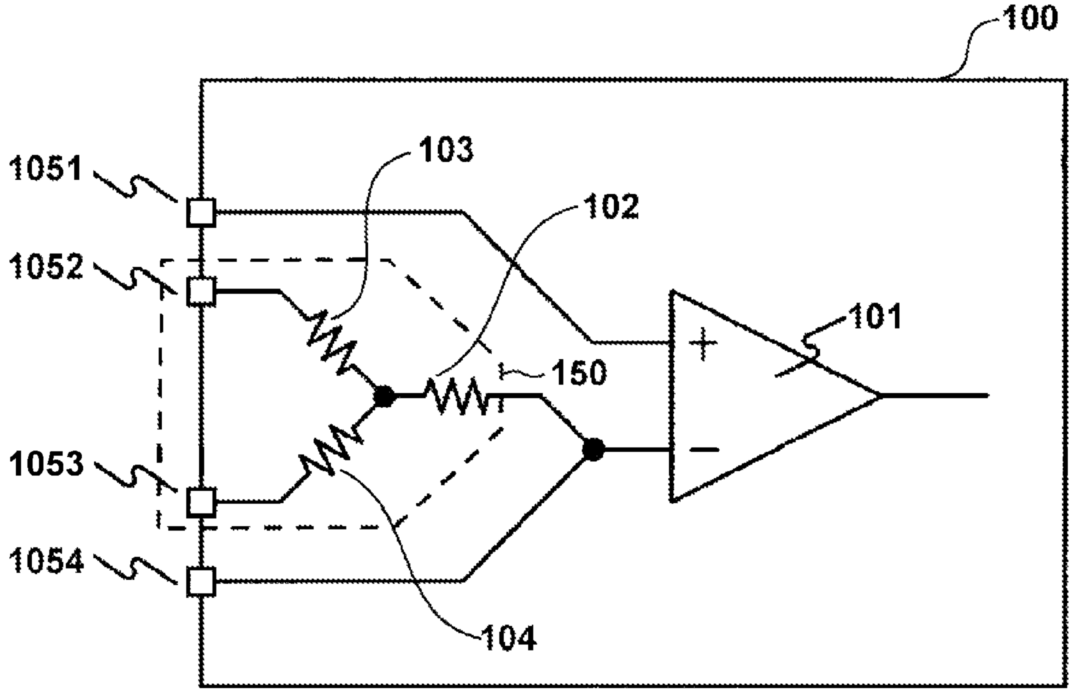
FIG. 2 is a circuit diagram exemplifying the arrangement of the input portion of a printing element substrate in the first embodiment.

FIG. 2 exemplifies the arrangement of the input portion of the printing element substrate in the first embodiment. FIG. 2 is a circuit diagram showing the input portion of an LVDS receiver arranged on the printing element substrate.

As shown in FIG. 2, the input portion of the printing element substrate 100 includes an LVDS receiver 101 which receives differential signals, input pads 1051 and 1054 which are connected to two input terminals of the LVDS receiver 101, and a variable resistance section 150. The variable resistance section 150 includes resistive elements 102, 103, and 104, and input pads 1052 and 1053. The variable resistance section 150 adjusts the resistance between the two input terminals of the LVDS receiver 101.

The input pad 1051 corresponds to the first input pad, and the input pad 1054 corresponds to the second input pad. The input pad 1052 corresponds to the third input pad, and the input pad 1053 corresponds to the fourth input pad. The resistive element 102 corresponds to the first resistive element, the resistive element 103 corresponds to the second resistive element, and the resistive element 104 corresponds to the third resistive element.

One terminal (to be referred to as a positive input terminal) out of the two differential input terminals of the LVDS receiver 101 is connected to the input pad 1051. The other terminal (to be referred to as a negative input terminal) is connected to the input pad 1054. Of differential signals, a signal input to the positive input terminal will be referred to as the first signal, and a signal input to the negative input terminal will be referred to as the second signal. The positive input terminal corresponds to the first terminal, and the negative input terminal corresponds to the second terminal.

One of the two terminals of the resistive element 102 is connected to the negative input terminal out of the two differential input terminals of the LVDS receiver 101. The other one of the two terminals of the resistive element 102 is connected to the resistive elements 103 and 104. One of the two terminals of the resistive element 103 is connected to the resistive elements 102 and 104, and the other terminal is connected to the input pad 1052. One of the two terminals of the resistive element 104 is connected to the resistive elements 102 and 103, and the other terminal is connected to the input pad 1053.

The printing element substrate 100 is fabricated by a semiconductor manufacturing process. A plurality of printing element substrates 100 are formed at once on one silicon wafer and cut out to obtain the individual printing element substrates 100. The resistive elements 102, 103, and 104 of the printing element substrate 100 can be formed by patterning a material such as polysilicon by photolithography, or as diffused resistors in which boron, phosphorus, or the like is diffused in a silicon substrate via a mask formed at a desired position by photolithography. When printing element substrates are formed using such a semiconductor manufacturing process, the film thickness and width of the material vary between positions on the silicon wafer or manufacturing lots. Hence, the resistances of even the resistive elements 102, 103, and 104 vary by about 20 to 30% between the printing element substrates 100.

Figure 15A:
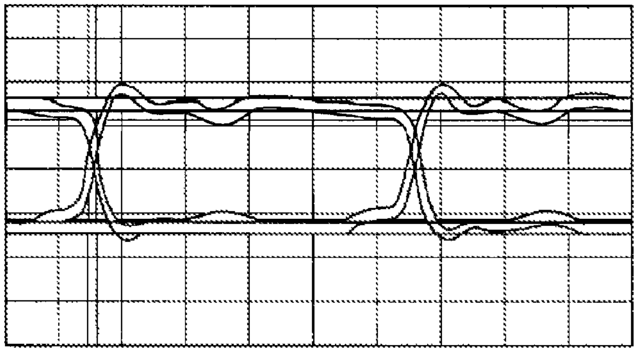
FIGS. 15A and 15B are charts each exemplifying the data transfer waveform.
Figure 15B:
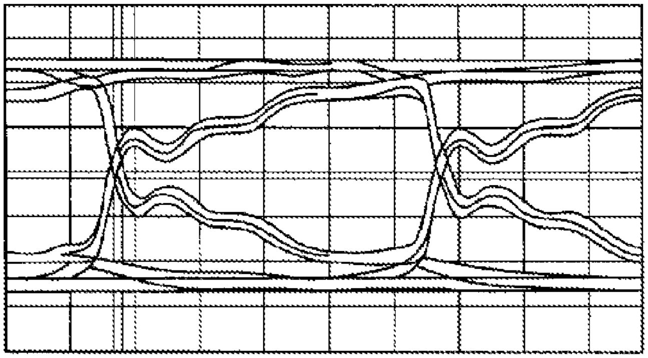

If the resistive elements arranged as terminating resistors have variations as large as about 20 to 30%, some printing element substrates may generate an impedance mismatch to distort the data transfer waveform, as shown in FIG. 15B, failing high-speed data transfer.

FIGS. 3A to 3D are circuit diagrams each exemplifying the connection configuration of the head substrate and printing element substrate. The head substrate 201 shown in FIGS. 3A to 3D is a wiring board having an electrical wiring structure, such as an FPC (Flexible Printed Circuit), PCB (Printed Circuit Board), or ceramic wiring board.

The printing element substrate 100 is mounted on the supporting member 263 of the printhead 200 shown in FIGS. 1A and 1B. The head substrate 201 includes pad portions 2021 to 2024, transmission lines 2041 and 2042, and external connection terminals 2031 and 2032. The transmission line 2041 corresponds to the first transmission line, and the transmission line 2042 corresponds to the second transmission line.

The pad portions 2021 to 2024 are terminals for electrically connecting to the printing element substrate 100 via wires 205 by wire bonding. The external connection terminals 2031 and 2032 are terminals for electrically connecting the pad portions 2021 to 2024 and the outside of the head substrate 201. The transmission lines 2041 and 2042 are a pair of wiring lines for transmitting differential signals externally input via the external connection terminals 2031 and 2032 to the LVDS receiver 101.

The transmission line 2042 is connected to the pad portion 2024 and external connection terminal 2032. The transmission line 2041 has one end commonly connected to the pad portions 2021 to 2023, and the other end connected to the external connection terminal 2031. The pad portion 2024 is connected via the wire 205 by wire bonding to the input pad 1054 connected to the negative input terminal of the LVDS receiver 101. The input pad 1051 connected to the positive input terminal of the LVDS receiver 101 is connected to the pad portion 2021 via the wire 205 by wire bonding. This arrangement is common to FIGS. 3A to 3D.

Figure 3A:
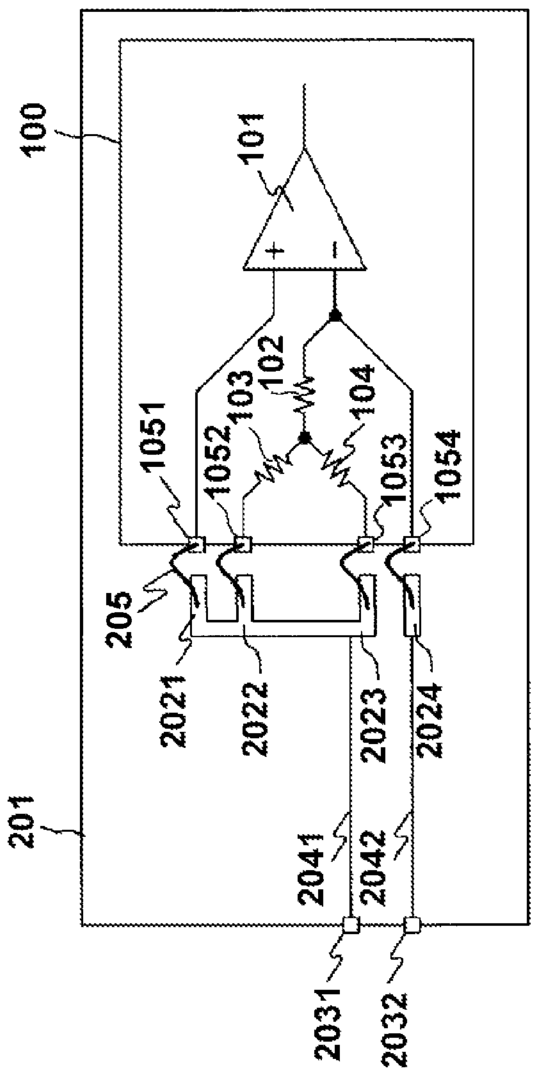
FIG. 3A is a circuit diagram exemplifying the connection configuration of a head substrate and printing element substrate in the first embodiment.
Figure 3B:
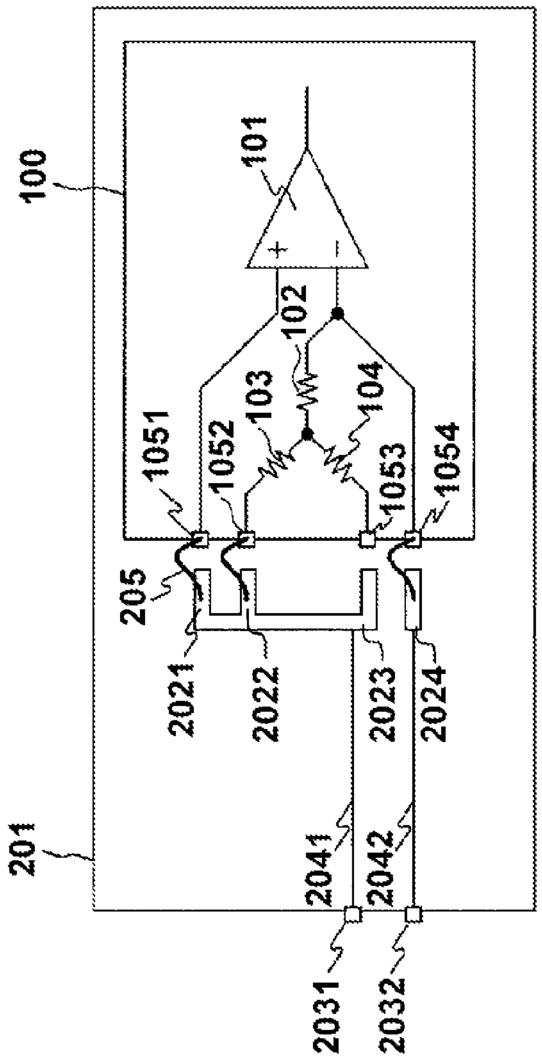
FIG. 3B is a circuit diagram exemplifying the connection configuration of the head substrate and printing element substrate in the first embodiment.
Figure 3C:
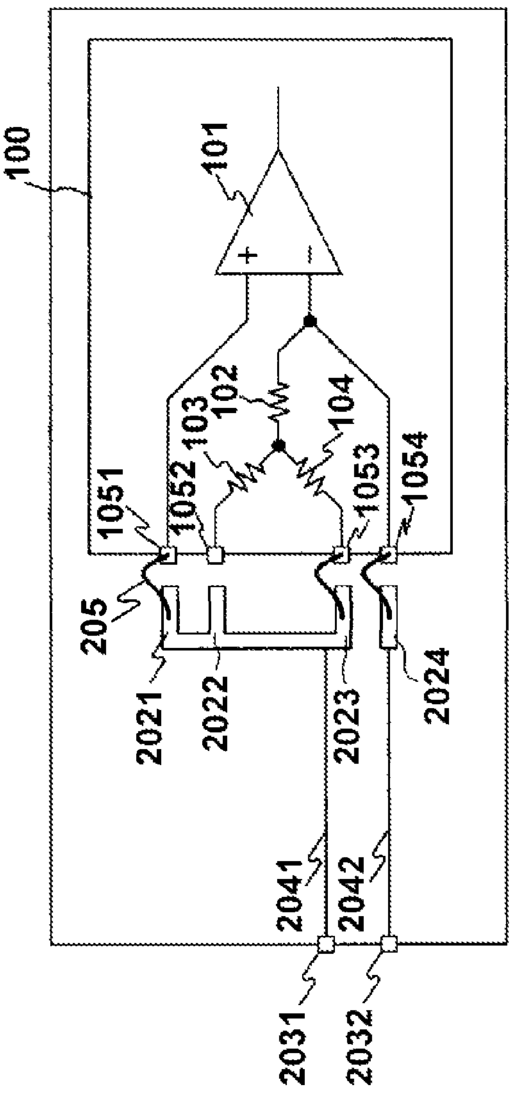
FIG. 3C is a circuit diagram exemplifying the connection configuration of the head substrate and printing element substrate in the first embodiment.

The connection between the pad portions 2022 and 2023 and the printing element substrate 100 can be selected from connections shown in FIGS. 3A to 3C in accordance with the values of a plurality of resistive elements arranged on the printing element substrate.

In the arrangement shown in FIG. 3A, the pad portion 2022 and input pad 1052 are connected via the wire 205, and the pad portion 2023 and input pad 1053 are connected via the wire 205. In the arrangement shown in FIG. 3B, the pad portion 2022 and input pad 1052 are connected via the wire 205, but the pad portion 2023 and input pad 1053 are not connected. In the arrangement shown in FIG. 3C, the pad portion 2022 and input pad 1052 are not connected, but the pad portion 2023 and input pad 1053 are connected via the wire 205. In the arrangement shown in FIG. 3D, the pad portion 2022 and input pad 1052 are not connected, and the pad portion 2023 and input pad 1053 are not connected, either.

FIGS. 4A to 4D are perspective views each showing an outer appearance when the head substrate and printing element substrate are connected by wire bonding. FIGS. 4A to 4D correspond to FIGS. 3A to 3D, respectively. R1, R2, and R3 are the resistances of the resistive elements 102, 103, and 104 arranged on the printing element substrate, respectively.

Figure 4A:
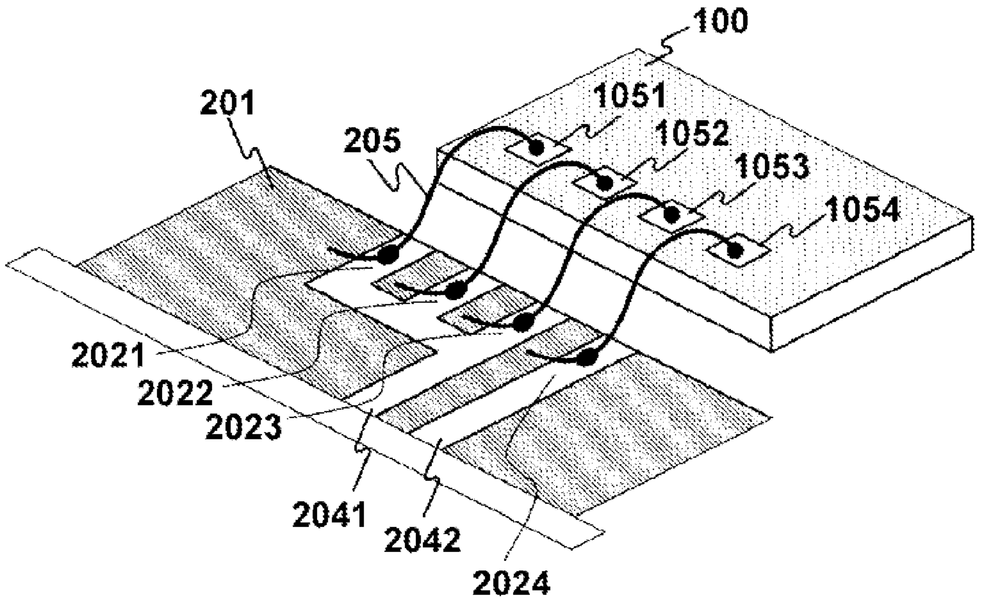
FIG. 4A is a perspective view showing an outer appearance when the head substrate and printing element substrate are connected by wire bonding.

In the arrangement shown in FIGS. 3A and 4A, the pad portion 2022 and input pad 1052 are connected via the wire 205, and the pad portion 2023 and input pad 1053 are connected via the wire 205. In this case, letting RA be the combined resistance between the transmission lines 2041 and 2042, it is given by $$RA = R1 + R2 // R3$$
$$= R1 + (R2 \cdot R3)/(R2 + R3)$$

Figure 4B:
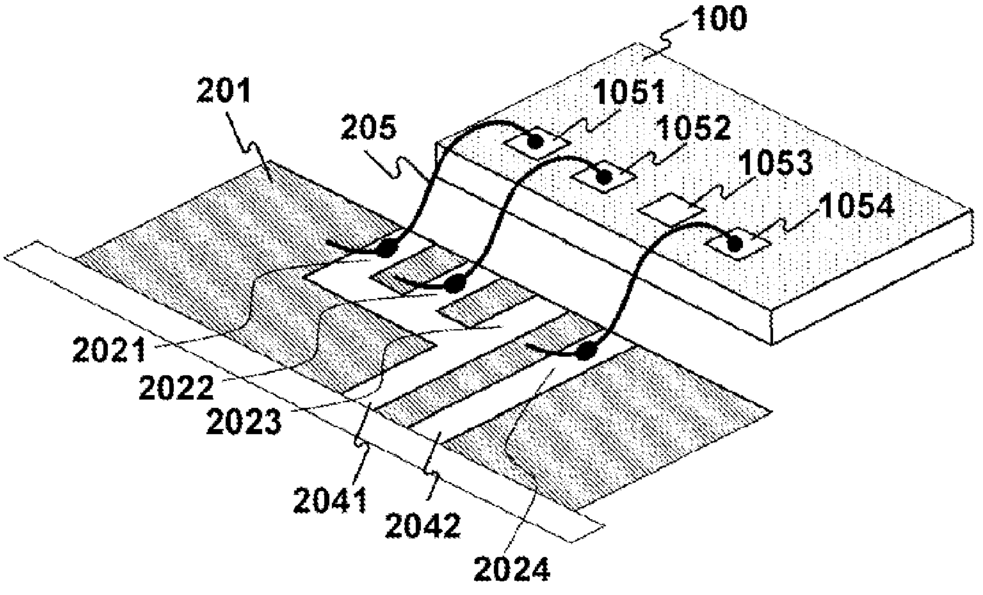
FIG. 4B is a perspective view showing an outer appearance when the head substrate and printing element substrate are connected by wire bonding.

In the arrangement shown in FIGS. 3B and 4B, the pad portion 2022 and input pad 1052 are connected via the wire 205, but the pad portion 2023 and input pad 1053 are not connected. In this case, letting RB be the combined resistance between the transmission lines 2041 and 2042, it is given by $$RB=R1+R2$$

Figure 4C:
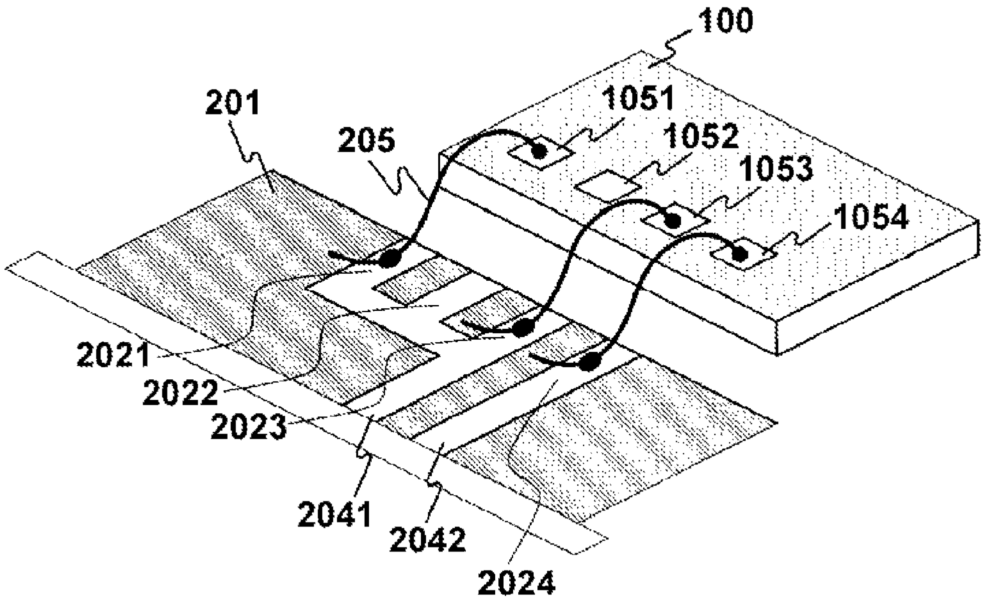
FIG. 4C is a perspective view showing an outer appearance when the head substrate and printing element substrate are connected by wire bonding.

In the arrangement shown in FIGS. 3C and 4C, the pad portion 2022 and input pad 1052 are not connected, but the pad portion 2023 and input pad 1053 are connected via the wire 205. In this case, letting RC be the combined resistance between the transmission lines 2041 and 2042, it is given by $$RC=R1+R3$$

That is, the three resistances RA, RB, and RC can be used as the resistances of the terminating resistors by selecting three connection configurations as shown in FIGS. 3A, 3B, and 3C in accordance with the state of the printing element substrate. The resistive elements 102 to 104 are set so that the profiles of adjacent combined resistances overlap each other when a plurality of printing element substrates are manufactured and the combined resistances RA, RB, and RC are plotted.

Figure 3D:
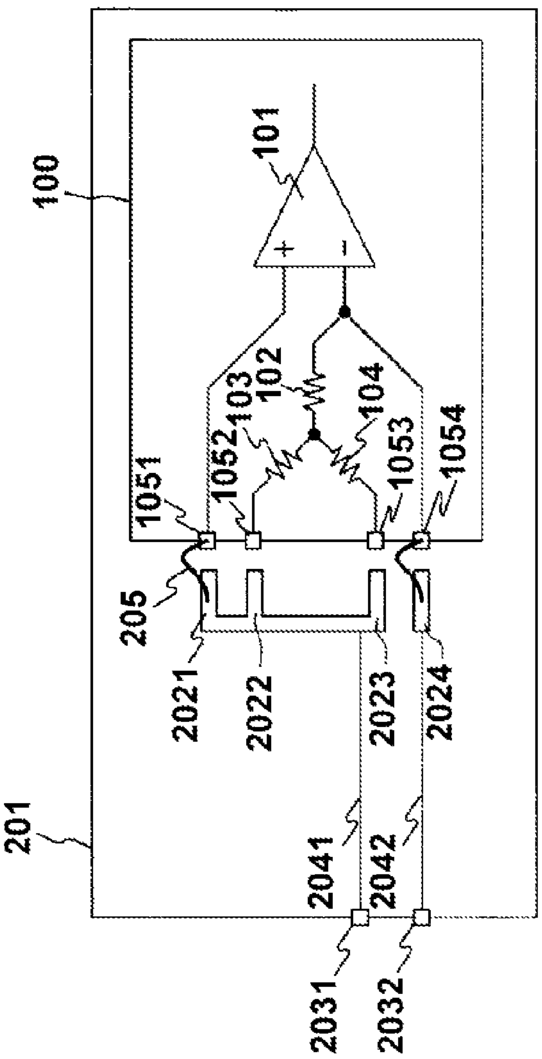
FIG. 3D is a circuit diagram exemplifying the connection configuration of the head substrate and printing element substrate in the first embodiment.
Figure 4D:
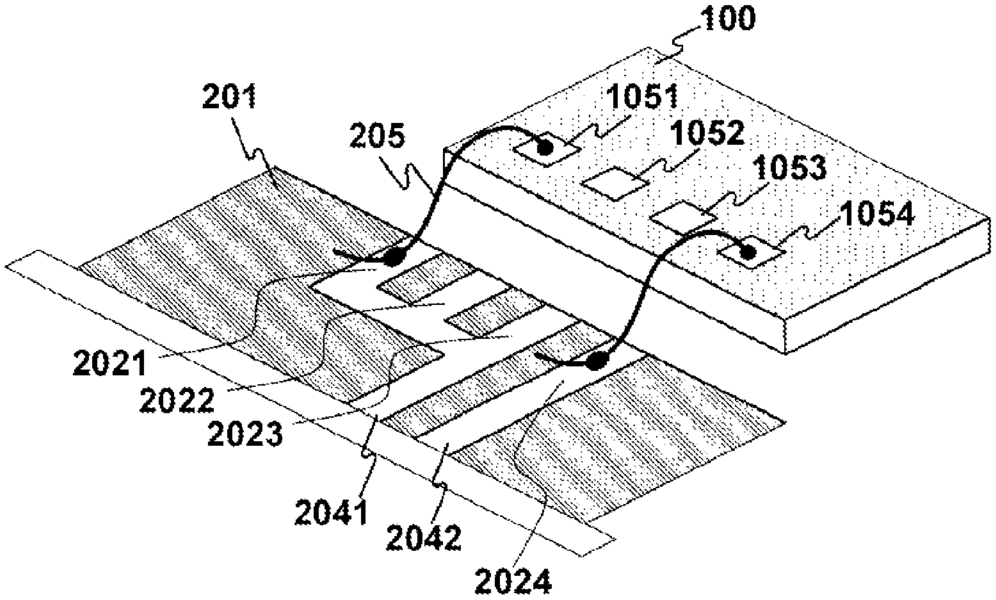
FIG. 4D is a perspective view showing an outer appearance when the head substrate and printing element substrate are connected by wire bonding.

In the arrangement shown in FIGS. 3D and 4D, the pad portion 2022 and input pad 1052 are not connected, and the pad portion 2023 and input pad 1053 are not connected, either. In this case, when viewed from the transmission lines 2041 and 2042, no resistive element is connected between the differential input terminals of the LVDS receiver 101, and the pad portion 2022 and input pad 1052 and the pad portion 2023 and input pad 1053 are open. This connection configuration is used when no terminating resistance element is required, like the multidrop connection of the LVDS receivers 101, details of which will be described with reference to FIG. 13.

The three resistive elements 102 to 104 of the printing element substrate are fabricated by a semiconductor process. Thus, the resistances R1, R2, and R3 of resistive elements on many printing element substrates vary by 20 to 30%.

However, the resistive elements 102 to 104 on one printing element substrate are manufactured at once and are close to each other on the silicon wafer. The relative ratio of the resistances R1, R2, and R3 of resistive elements on a single substrate is almost constant. Hence, the magnitude ratio of the combined resistances RA, RB, and RC of a plurality of resistive elements fabricated on a single substrate is also almost constant against manufacturing variations.

More specifically, a plurality of resistances are set for one printing element substrate, and pad portions to be connected are selected in accordance with the finish of the printing element substrate. Resistance variations of the terminating resistor when connecting a wiring board can be made smaller than variations of 20 to 30% in the resistances R1, R2, and R3 arising from manufacturing variations.

A case in which R1, R2, and R3 are set to increase the combined resistance in order of RA, RB, and RC and the design target of the combined resistance RB is set to 100Ω will be explained with reference to FIG. 5.

Figure 5:
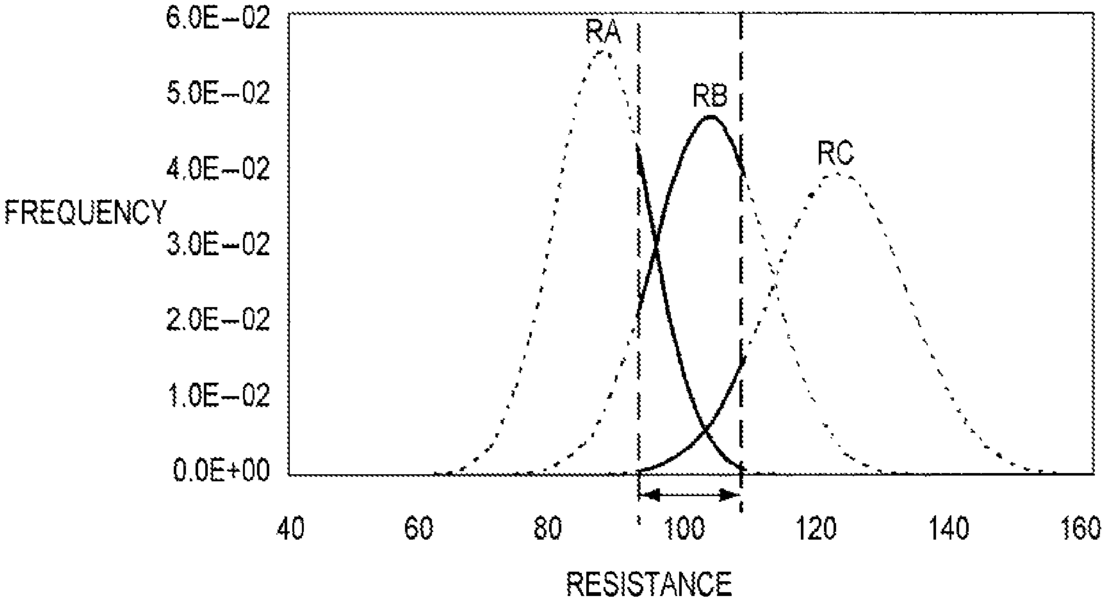
FIG. 5 is a graph for explaining a method of correcting resistance variations.

FIG. 5 is a graph when many printing element substrates are manufactured and the combined resistances RA, RB, and RC are plotted. FIG. 5 shows that each combined resistance has a resistance distribution of about 20%. The abscissa indicates the resistance, and the ordinate indicates the frequency. In this case, the resistances R1, R2, and R3 of the three resistive elements are set so that a partial resistance region of the profile of the combined resistance RA overlaps that of the profile of RB and a partial resistance region of the profile of the combined resistance RB overlaps that of the profile of the combined resistance RC.

When the resistances of the resistive elements of a selected printing element substrate are close to the design values, the combined resistance RB becomes almost 100Ω, and thus connection is selected so the combined resistance RB shown in FIG. 5 becomes a terminating resistance. That is, the connection configuration as in FIGS. 3B and 4B is selected.

A case in which the resistances R1, R2, and R3 of the printing element substrate vary to be smaller than the design values owing to manufacturing variations will be examined. For example, when the combined resistance RB becomes almost 80Ω, the combined resistances RA and RC also vary to be smaller than the design values in correlation with the combined resistance RB, and connection is selected so the combined resistance RC becomes a terminating resistance. That is, the connection configuration as in FIGS. 3C and 4C is selected.

A case in which the resistances R1, R2, and R3 of the printing element substrate vary to be larger than the design values owing to manufacturing variations will be considered. For example, when the combined resistance RB becomes almost 120Ω, the combined resistances RA and RC also vary to be larger than the design values in correlation with the combined resistance RB, and connection is therefore selected so the combined resistance RA becomes a terminating resistance. That is, the connection as in FIGS. 3A and 4A is selected.

In this manner, one of the connection states in FIGS. 3A to 3C is selected in accordance with the state of the printing element substrate. The resistances of the terminating resistance elements can fall within a range defined by vertical broken lines shown in FIG. 5. That is, the variation range of the terminating resistor can be narrowed, compared to the manufacturing variations of about 20 to 30% in the resistances R1, R2, and R3 of the resistive elements in the semiconductor manufacturing process. This can suppress deterioration of the transmission waveform caused by an impedance mismatch, achieving high-speed data transfer.

Figure 6:
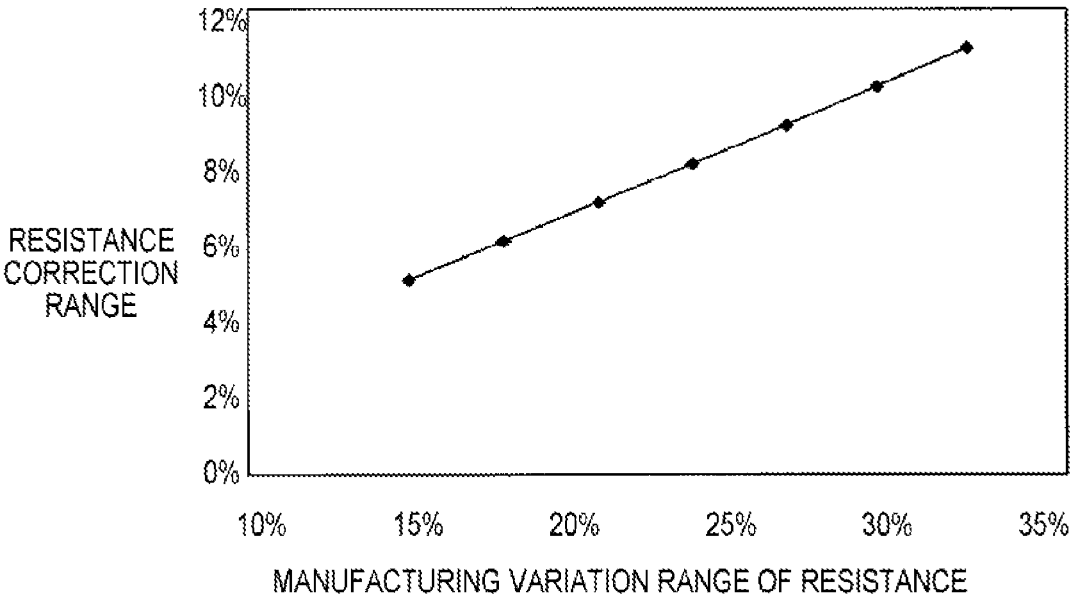
FIG. 6 is a graph for explaining the correction range for resistance variations.

FIG. 6 is a graph showing resistance manufacturing variations in the use of a semiconductor process, and the terminating resistance correction range in which variations are suppressed by arranging and selecting from the three combined resistances RA, RB, and RC. Referring to FIG. 6, since the three combined resistances are set to be selectable, the variation range of the corrected resistance is reduced to about ⅓ of the manufacturing resistance variation range. That is, the embodiment has explained an example in which one of the three combined resistances can be selected using the three resistive elements 102 to 104. However, to reduce the resistance variation range to 1/n (n is an integer), pad portions and wiring boards are arranged so that one of n combined resistances can be selected.

Figure 7:
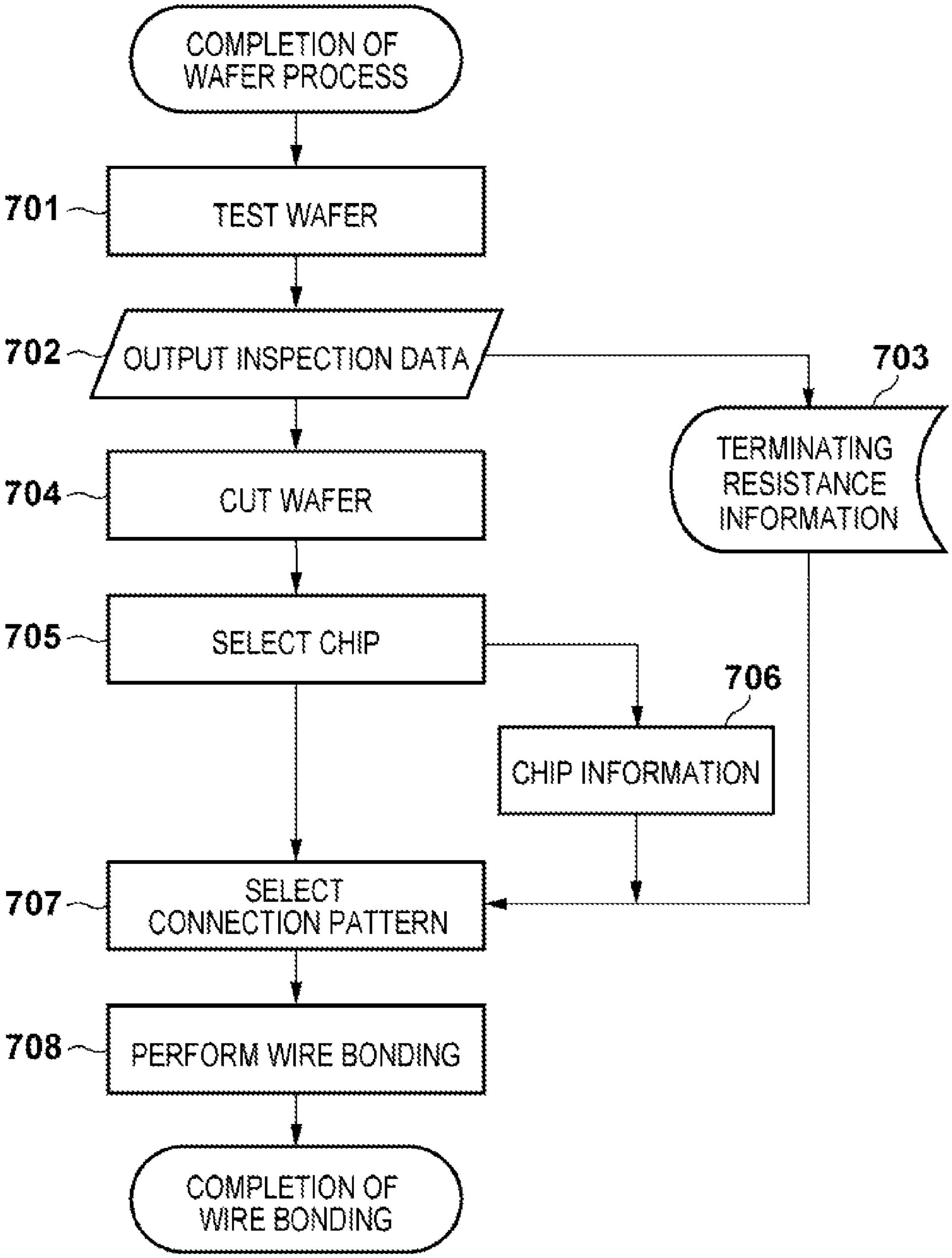
FIG. 7 is a flowchart showing the main part of a printhead manufacturing method in the first embodiment.

A printhead manufacturing method according to the first embodiment will be explained. FIG. 7 is a flowchart showing a sequence from inspection of a silicon wafer up to mounting of a chip in the printhead manufacturing method according to the first embodiment.

Upon completion of a process of manufacturing a wafer including a plurality of printing element substrate chips, wafer inspection is performed for chip non-defective determination (step 701). At this time, a plurality of combined resistances based on combinations of two or more resistive elements out of a plurality of resistive elements arranged in the variable resistance section of the printing element substrate are measured. The combined resistance can be measured by bringing a measurement terminal into contact with the input pads 1052 to 1054 shown in FIG. 2. Information about a plurality of combined resistances will be called terminating resistance information. Then, the chip non-defective determination result and terminating resistance information are output (step 702). A description of the chip non-defective determination result will be omitted. The terminating resistance information obtained by the inspection is stored (step 703). At this time, chip information including an identifier different for each chip is stored together with the terminating resistance information.

After the wafer is cut into a plurality of chips (step 704), a non-defective chip is mounted on the supporting member of a printhead (step 705). The mounted chip and the terminating resistance information obtained by wafer inspection are collated (step 706). One of the connection patterns shown in FIGS. 3A to 3C is selected so that a target terminating resistance can be obtained for each chip (step 707). When a plurality of substrates are manufactured simultaneously, variations between substrates located close to each other are small. Thus, only a plurality of portions on a substrate may be measured to select the connection state of an unmeasured substrate. Subsequently, wire bonding is performed based on the selected connection pattern (step 708), completing the wire bonding process.

In the above-described way, variations in the resistance of the terminating resistance element connected between the two input terminals of the receiver of each chip can be corrected.

The printing element substrate according to the embodiment includes a plurality of resistive elements at the input portion of the printing element substrate, and a plurality of pads connected to one of the two input terminals of the receiver using the combined resistance of two or more resistive elements as a terminating resistance. Pads are connected so that a target terminating resistance is set between the two input terminals of the receiver. The embodiment can obtain an effect of correcting variations in the resistance of the terminating resistance element owing to manufacturing variations in a semiconductor process. As a result, deterioration of the transmission waveform caused by an impedance mismatch can be suppressed, and data can be transferred quickly without raising the manufacturing cost of the printing element substrate and impairing the reliability of the printhead.

The arrangement of the pad portions of a receiver including resistive elements of the resistances R1, R2, and R3 on the printing element substrate will be described in detail.

Figure 11:
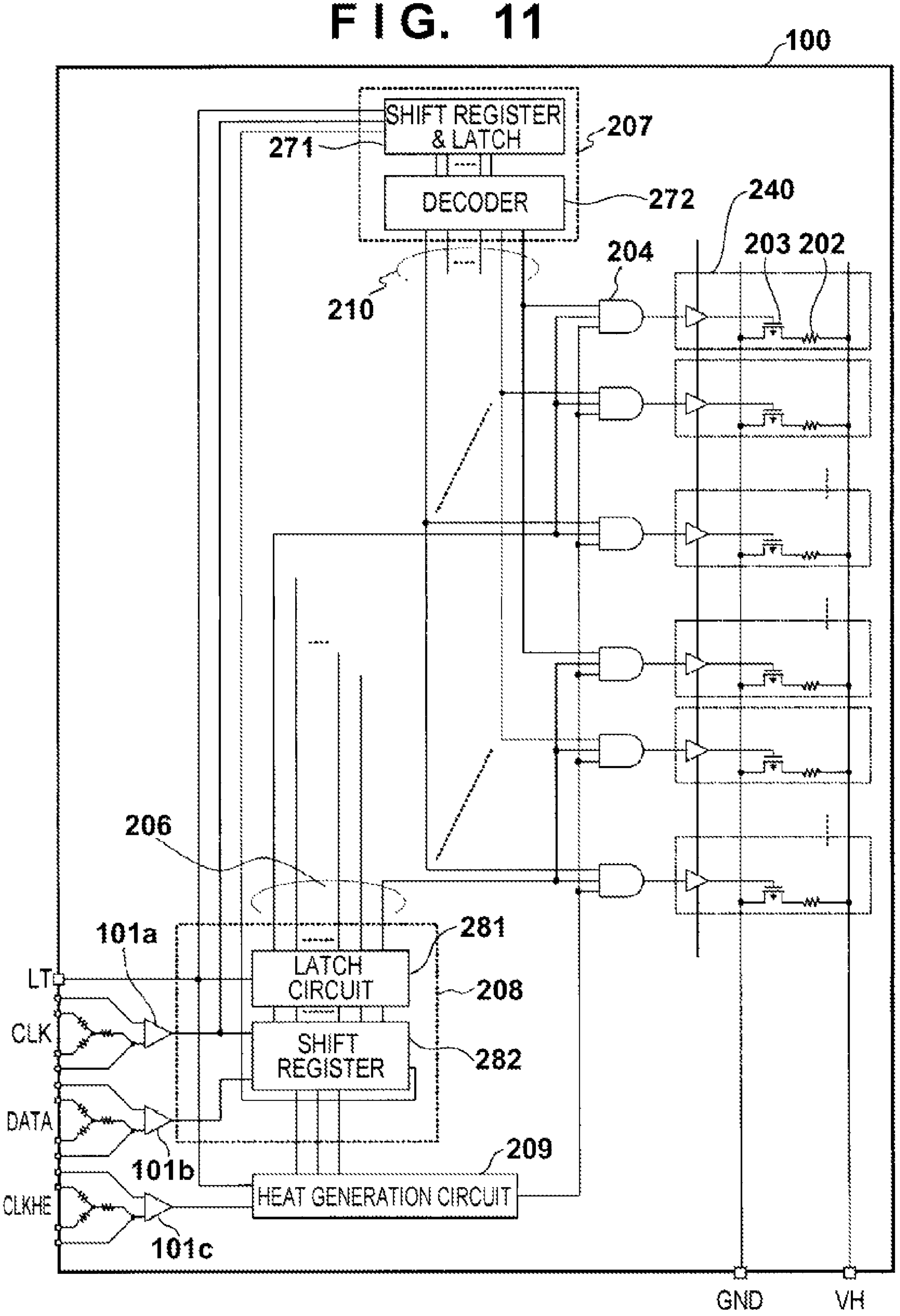
FIG. 11 is a diagram exemplifying the arrangement of a printing element substrate in the first embodiment.

FIG. 11 is a diagram exemplifying the arrangement of the printing element substrate.

As shown in FIG. 11, the printing element substrate 100 includes a print data supply circuit 208, a block selection circuit 207, and a plurality of printing element driving circuits 240. LVDS receivers 101*a* to 101*c* are arranged at the input portion of the printing element substrate 100 and receive differential signals each of a CLK signal, DATA signal, and CLKHE signal. The printing element substrate 100 also includes a heat generation circuit 209 which receives an output signal from the LVDS receiver 101*c*. Further, the printing element substrate 100 includes a plurality of AND circuits 204 which receive an output signal from the block selection circuit 207 and an output signal from the heat generation circuit 209, and output signals to a plurality of printing element driving circuits 240.

The print data supply circuit 208 includes a shift register 282 and latch circuit 281. The block selection circuit 207 includes a circuit 271 including a shift register and latch, and a decoder 272. Each printing element driving circuit 240 includes a printing element 202 and a power transistor 203 which controls a current to be supplied to the printing element 202. The heat generation circuit 209 is formed from, for example, a counter. In FIG. 11, GND is a terminal which receives the ground potential, and VH is a terminal which receives the power supply potential.

The operation of the printing element substrate shown in FIG. 11 will be explained.

The LVDS receiver 101*a* converts differential signals of the CLK signal into a single-end signal and supplies it to the print data supply circuit 208 and block selection circuit 207. The LVDS receiver 101*b* converts differential signals of the DATA signal into a single-end signal and supplies it to the print data supply circuit 208. The LVDS receiver 101*c* converts differential signals of the CLKHE signal into a single-end signal and supplies it to the heat generation circuit 209. An LT signal is input to the block selection circuit 207, print data supply circuit 208, and heat generation circuit 209.

In the print data supply circuit 208, the shift register 282 receives the DATA signal synchronized with the CLK signal. The latch circuit 281 receives each bit signal of the shift register 282, latches it in accordance with the LT signal, and outputs it to a corresponding AND circuit 204. This signal is a print data signal 206 shown in FIG. 11. A serial output from the shift register 282 of the print data supply circuit 208 is input to the shift register of the circuit 271 of the block selection circuit 207 in synchronism with the CLK signal. The circuit 271 latches data in accordance with the LT signal, and outputs it to the decoder 272. Based on the input signal from the circuit 271, the decoder 272 outputs a block selection signal via one of a plurality of wiring lines for transmitting a block selection signal 210.

The heat generation circuit 209 receives a serial output from the shift register 282 and the LT signal. Upon receiving the CLKHE signal from the LVDS receiver 101*c*, the heat generation circuit 209 latches serial data from the shift register in accordance with the LT signal. The heat generation circuit counts the number of pulses of the CLKHE signal based on the latched data, and generates a heat pulse as a signal indicating the timing to drive the printing element.

Each AND circuit 204 ANDs the heat pulse, block selection signal 210, and print data signal 206, and outputs the result to a corresponding printing element driving circuit 240. The power transistor 203 is turned on in response to the signal input from the AND circuit 204 to the printing element driving circuit 240. Then, a current flows through the printing element 202.

Figure 12:
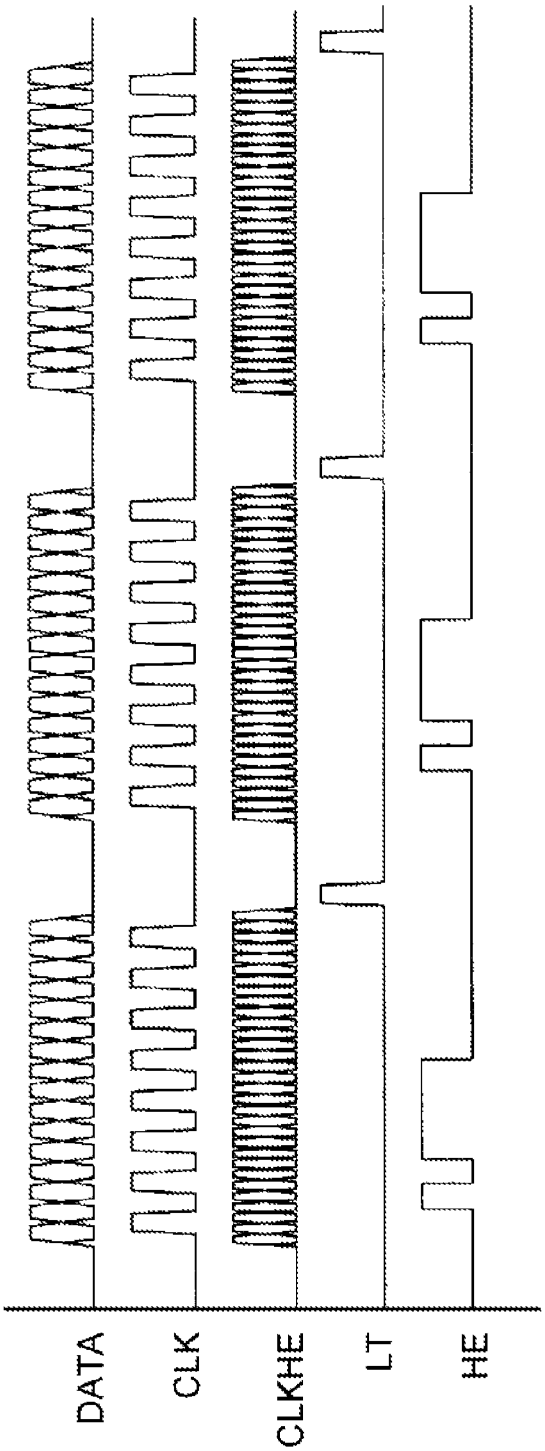
FIG. 12 is a timing chart showing the timings of signals input to the printing element substrate.

FIG. 12 is a timing chart showing the timings of signals input to the printing element substrate. The operation of the circuit shown in FIG. 11 will be explained with reference to the timings shown in FIG. 12.

Each of the DATA signal, CLK signal, and CLKHE signal is input as differential signals to the printing element substrate 100. However, FIG. 12 shows the timing of only a signal transmitted to one signal line. The DATA signal is input to the printing element substrate 100 in synchronism with the CLK signal, and converted into a single-end signal by the LVDS receiver 101*b*. The DATA signal includes the print data signal 206, the block selection signal 210, and heat pulse information, and is input as serial data to the shift register 282.

The DATA signal is input to the shift register 282 at a timing between the leading and trailing edges of the CLK signal. Based on the heat pulse information of the DATA signal, the heat generation circuit 209 counts the number of pulses of the CLKHE signal, and generates a heat pulse (HE signal). To represent execution of one printing operation, FIG. 12 shows double pulses made up of short and long pulses.

Figure 13:
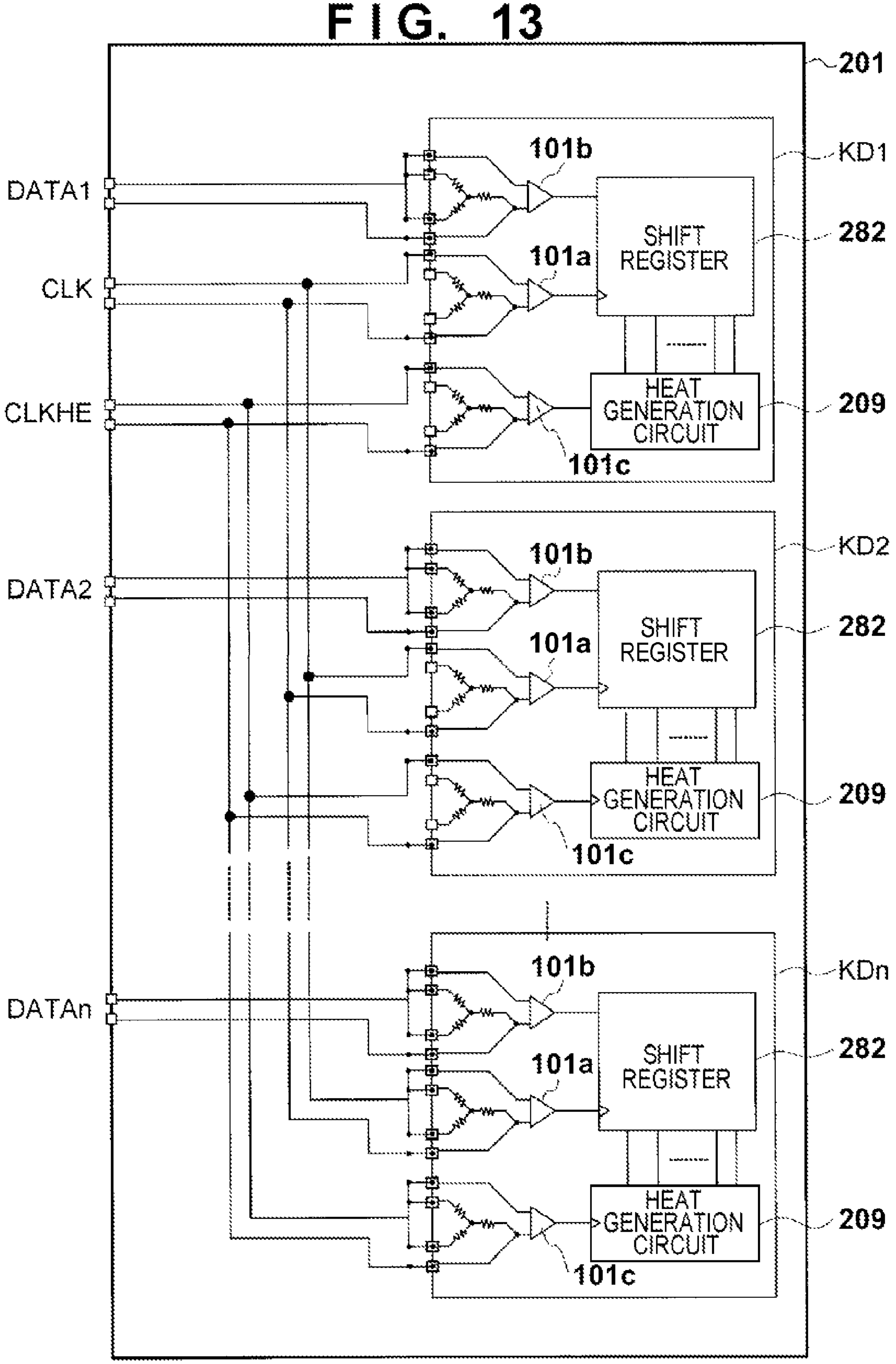
FIG. 13 is a diagram exemplifying the arrangement of a head substrate in the first embodiment.
Figure 14:
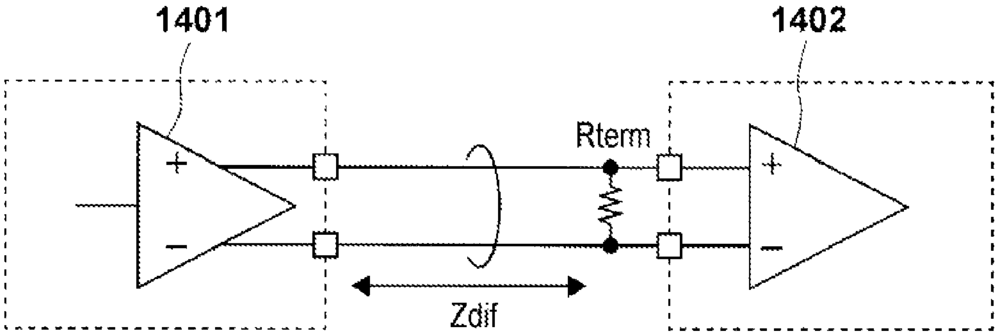
FIG. 14 is a circuit diagram for explaining a data transfer method according to the related LVDS scheme.

FIG. 13 is a diagram exemplifying the arrangement of the head substrate when a plurality of printing element substrates shown in FIG. 11 are connected. FIG. 13 schematically shows an arrangement in which a plurality of printing element substrates 100 shown in FIG. 11 are mounted on the supporting member 263 shown in FIG. 1B and are connected to the connection electrode 253 of the head substrate 201.

Note that FIG. 13 shows the input portion, the shift register 282 of the print data supply circuit 208, and the heat generation circuit 209 out of the printing element substrate 100 shown in FIG. 11, and the remaining circuits are not illustrated.

As shown in FIG. 13, printing element substrates KD1 to KDn (n is an integer of 2 or more) are mounted on the supporting member (not shown), and the input portions of the printing element substrates KD1 to KDn are connected to the terminals of the head substrate 201. In FIG. 13, DATA1 to DATAn are terminals for inputting a data signal externally to the head substrate 201, CLK is a terminal for inputting the CLK signal, and CLKHE is a terminal for inputting the CLKHE signal. These terminals will be called head connection terminals.

The head connection terminals CLK and CLKHE are commonly connected to the printing element substrates KD1 to KDn. The respective head connection terminals DATA1 to DATAn are connected to the corresponding printing element substrates KD1 to KDn.

On the printing element substrate KDn, terminating resistance elements are connected between transmission lines for inputting differential signals to the LVDS receivers 101*a* and 101*c*. In contrast, on the printing element substrates KD1 and KD2, no terminating resistance element is connected between transmission lines for inputting differential signals to the LVDS receivers 101*a* and 101*c*.

That is, one of the connection configurations in FIGS. 3A to 3C is selected and connected to the head substrate, and the remaining printing element substrates are connected to the head substrate in the connection configuration as in FIG. 3D so that a signal commonly input to a plurality of printing element substrates is connected to a terminating resistor on only one printing element substrate. This is because the head connection terminals CLK and CLKHE are parallel-connected to a plurality of LVDS receivers 101*a* and a plurality of LVDS receivers 101*c*, respectively. In the arrangement example shown in FIG. 13, the head connection terminals CLK and CLKHE are connected to terminating resistors on the nth printing element substrate KDn farthest from the head connection terminals CLK and CLKHE commonly connected to the printing element substrates KD1 to KDn.

Terminals which are connected to respective printing element substrates and receive differential signals, like the head connection terminals DATA1 to DATAn, are connected by selecting one of the connection states in FIGS. 3A to 3C in accordance with the state of each printing element substrate.

Second Embodiment

The arrangement of a printhead in the second embodiment will be described. Note that the second embodiment will explain a difference from the first embodiment in detail. A detailed description of the same arrangement as that in the first embodiment will not be repeated.

FIGS. 8A to 8D are views each exemplifying the connection configuration of a head substrate and printing element substrate in the second embodiment. FIGS. 8A to 8D correspond to FIGS. 3A to 3D in the first embodiment, respectively. However, the arrangement of the head substrate and the connection configuration of the head substrate and printing element substrate are different from those in the first embodiment. The arrangement of the printing element substrate is the same as that in the first embodiment.

As shown in FIGS. 8A to 8D, an input pad 1051 at the input portion of a printing element substrate 100 and a pad portion 2021 of a head substrate 201 are connected via a wire 205, and an input pad 1052 and pad portion 2022 are connected via the wire 205. An input pad 1053 and pad portion 2023 are connected via the wire 205, and an input pad 1054 and pad portion 2024 are connected via the wire 205.

The first embodiment has proposed different configurations of connection between the input pad of the printing element substrate 100 and the pad portion of the head substrate 201. In the first embodiment, the resistance is selected by switching the connection configuration. To the contrary, in the connection configuration of the second embodiment, the connection between the input pad and the pad portion is common, but the wiring connection pattern on the head substrate is different as shown in FIGS. 8A to 8D. This arrangement will be described in detail.

Figure 8A:
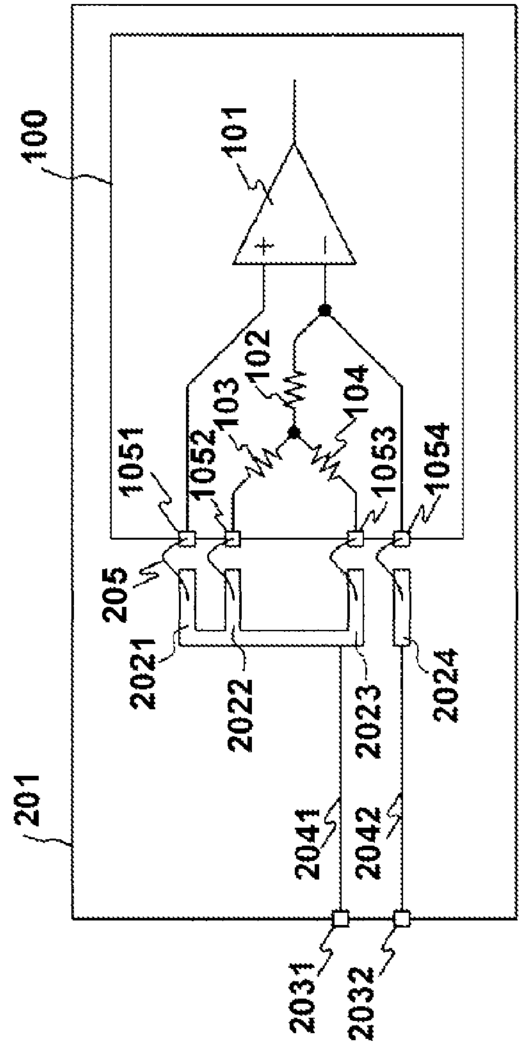
FIG. 8A is a circuit diagram exemplifying the connection configuration of a head substrate and printing element substrate in the second embodiment.

The arrangement shown in FIG. 8A is substantially the same as that described in the first embodiment with reference to FIG. 3A. Letting RA be the combined resistance between transmission lines 2041 and 2042, it is given by $$\begin{aligned} RA &= R1 + R2 // R3 \\ &= R1 + (R2 \cdot R3)/(R2 + R3) \end{aligned}$$

Figure 8B:
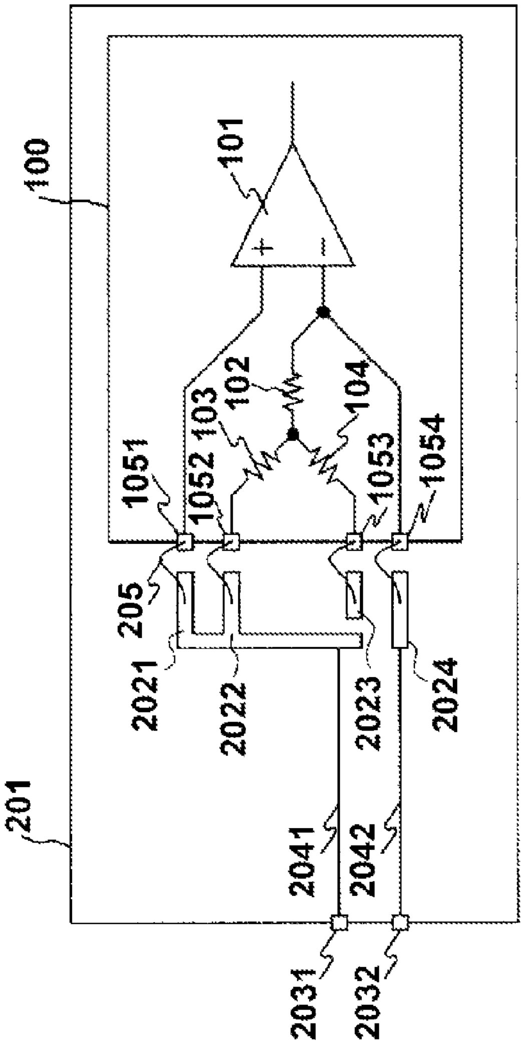
FIG. 8B is a circuit diagram exemplifying the connection configuration of the head substrate and printing element substrate in the second embodiment.

In the arrangement shown in FIG. 8B, the pad portion 2023 and input pad 1053 are connected via the wire 205, but the pad portion 2023 is not connected to the transmission line 2041. Thus, similar to the first embodiment, letting RB be the combined resistance between the transmission lines 2041 and 2042, it is given by $$RB = R1 + R2$$

Figure 8C:
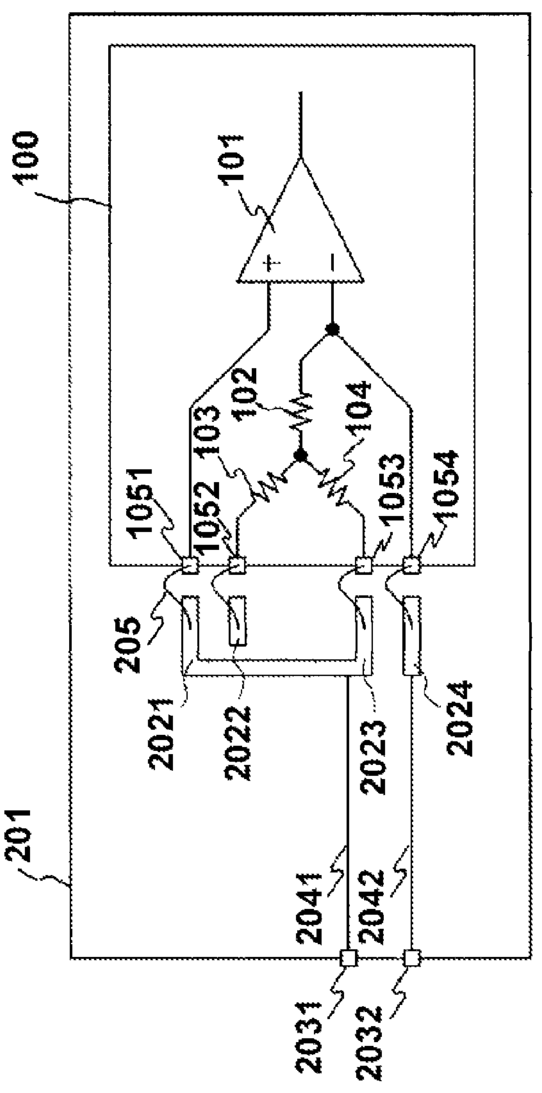
FIG. 8C is a circuit diagram exemplifying the connection configuration of the head substrate and printing element substrate in the second embodiment.

In the arrangement shown in FIG. 8C, the pad portion 2022 and input pad 1052 are connected via the wire 205, but the pad portion 2022 is not connected to the transmission line 2041. Similar to the first embodiment, letting RC be the combined resistance between the transmission lines 2041 and 2042, it is given by $$RC = R1 + R3$$

In the second embodiment, a plurality of types of head substrates are prepared by changing the configuration of connection between a plurality of pad portions and the transmission line 2041. By selecting one of the head substrates in accordance with the state of the printing element substrate, one of the combined resistances RA, RB, and RC can be selected as a terminating resistance. Even in the second embodiment, resistances connected between the transmission lines 2041 and 2042 become equal to those in the first embodiment. The second embodiment can therefore obtain an effect of correcting variations in terminating resistance, similar to the first embodiment.

Figure 8D:
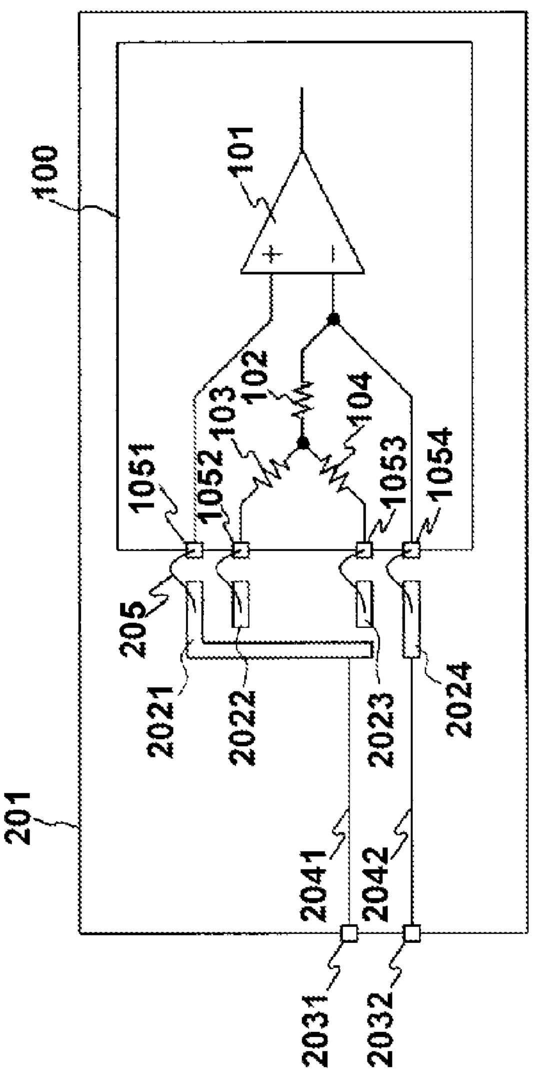
FIG. 8D is a circuit diagram exemplifying the connection configuration of the head substrate and printing element substrate in the second embodiment.

In the arrangement shown in FIG. 8D, the pad portion 2023 and input pad 1053 are connected via the wire 205, the pad portion 2022 and input pad 1052 are connected via the wire 205, but neither the pad portion 2022 nor 2023 is connected to the transmission line 2041. Thus, similar to the arrangement described in the first embodiment with reference to FIG. 3D, no terminating resistance element is connected to an LVDS receiver 101. The head substrate in FIG. 8D is used when no terminating resistance element is necessary, like the multidrop connection of the LVDS receivers 101.

Figure 9:
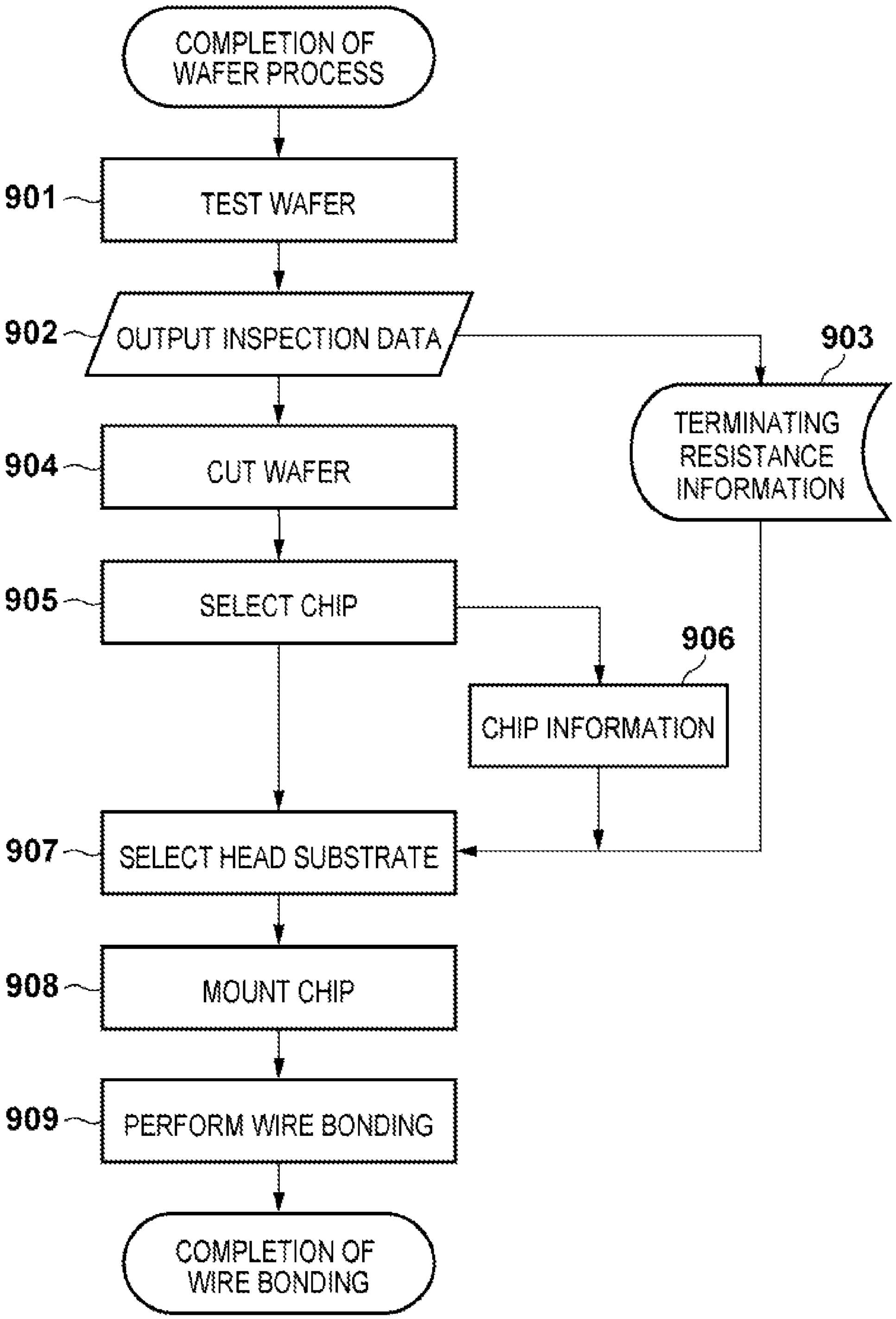
FIG. 9 is a flowchart showing the main part of a printhead manufacturing method in the second embodiment.

A printhead manufacturing method according to the second embodiment will be explained. FIG. 9 is a flowchart showing a sequence from wafer inspection up to chip mounting in the printhead manufacturing method according to the second embodiment. Note that a plurality of types of head substrates 201 shown in FIGS. 8A to 8D are prepared in advance.

Upon completion of a process of manufacturing a wafer including a plurality of printing element substrate chips, wafer inspection is performed for chip non-defective determination (step 901). At this time, a plurality of combined resistances based on combinations of two or more resistive elements out of a plurality of resistive elements arranged in the variable resistance section of the printing element substrate are measured. Information about a plurality of combined resistances will be called terminating resistance information. Then, the chip non-defective determination result and terminating resistance information are output (step 902). A description of the chip non-defective determination result will be omitted. The terminating resistance information obtained by the inspection is stored (step 903). At this time, chip information including an identifier different for each chip is stored together with the terminating resistance information.

After the wafer is cut into a plurality of chips (step 904), a non-defective chip is selected (step 905). Then, the selected chip and the terminating resistance information obtained by wafer inspection are collated (step 906). One of the head substrates shown in FIGS. 8A to 8C is selected so that a target terminating resistance can be obtained for each chip (step 907). When a plurality of substrates are manufactured simultaneously, variations between substrates located close to each other are small. Thus, only a plurality of portions on a substrate may be measured to select a head substrate corresponding to an unmeasured substrate. After that, the selected head substrate and chip are mounted on the supporting member of a printhead (step 908), and wire bonding is performed (step 909), completing the wire bonding process.

In this fashion, variations in the resistance of the terminating resistance element connected between the two input terminals of the receiver of each chip can be corrected.

In the second embodiment, the head substrate needs to be changed in accordance with variations in terminating resistance. However, the connection by wire bonding need not be changed in accordance with variations in terminating resistance, avoiding complication of the wiring bonding process.

Third Embodiment

The third embodiment is directed at another example of the arrangement of the input portion on the printing element substrate. The third embodiment will explain a difference from the first embodiment in detail. A detailed description of the same arrangement as that in the first embodiment will not be repeated.

Figure 10:
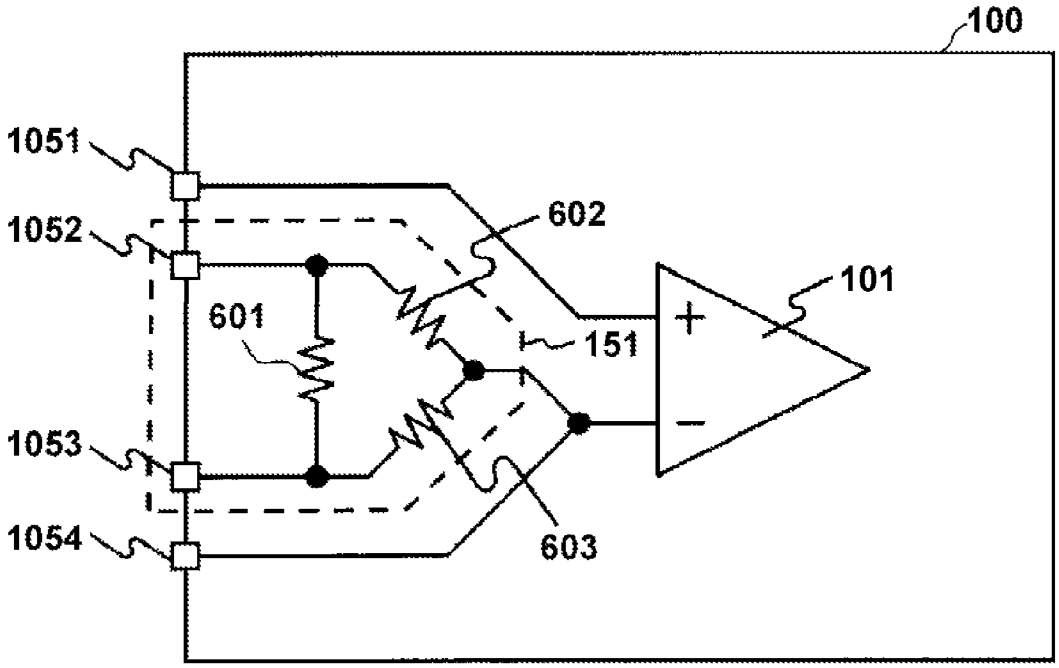
FIG. 10 is a circuit diagram exemplifying the arrangement of the input portion of a printing element substrate in the third embodiment.

FIG. 10 is a circuit diagram exemplifying the arrangement of the input portion of a printing element substrate in the third embodiment. FIG. 10 is a circuit diagram showing the input portion of an LVDS receiver arranged on the printing element substrate.

As shown in FIG. 10, the input portion of a printing element substrate 100 includes an LVDS receiver 101, input pads 1051 and 1054, and a variable resistance section 151 for adjusting the resistance between the two input terminals of the LVDS receiver 101. The variable resistance section 151 includes resistive elements 601, 602, and 603, and input pads 1052 and 1053. The positive input terminal out of the two differential input terminals of the LVDS receiver 101 is connected to the input pad 1051, and the negative input terminal is connected to the input pad 1054. The resistive element 602 corresponds to the first resistive element, the resistive element 603 corresponds to the second resistive element, and the resistive element 601 corresponds to the third resistive element.

One terminal of each of the resistive elements 602 and 603 is connected to the negative input terminal of the receiver 101. The other terminal of the resistive element 602 is connected to the input pad 1052, and the other terminal of the resistive element 603 is connected to the input pad 1053. One of the two terminals of the resistive element 601 is connected to the input pad 1052 and resistive element 602, and the other terminal is connected to the input pad 1053 and resistive element 603.

R1, R2, and R3 are the resistances of the resistive elements 601, 602, and 603, respectively. The connections shown in FIGS. 3A to 3C referred to in the first embodiment are applied to the connection between the input portion shown in FIG. 10 and the head substrate 201. The combined resistance between transmission lines 2041 and 2042 will be examined.

Letting RAA be the combined resistance in the connection shown in FIG. 3A, it is given by $$\begin{aligned} RAA &= R2 \,//\, R3 \\ &= R2 \cdot R3/(R2 + R3) \end{aligned}$$

Letting RBB be the combined resistance in the connection shown in FIG. 3B, it is given by $$\begin{aligned} RBB &= R2 \,//\, (R1 + R3) \\ &= R2 \cdot (R1 + R3)/(R1 + R2 + R3) \end{aligned}$$

Letting RCC be the combined resistance in the connection shown in FIG. 3C, it is given by $$RCC = R3 // (R1 + R2) = R3 \cdot (R1 + R2)/(R1 + R2 + R3)$$

By setting the resistances R1, R2, and R3, the combined resistances RAA, RBB, and RCC can be set to arbitrary resistances. Similar to the first and second embodiments, even the third embodiment can obtain an effect of correcting manufacturing variations in terminating resistance.

In the third embodiment, the parallel connection of resistive elements is a basic arrangement, unlike the first embodiment. To obtain the same combined resistance as that described in the first embodiment, the resistances R1 to R3 become higher than those in the first embodiment. The terminating resistance used in the LVDS receiver is as relatively low as about 100Ω. In the first embodiment, the resistances R1 to R3 are equal to or lower than 100Ω because the series connection of resistive elements is a basic arrangement. For a resistive element generally formed by a semiconductor manufacturing process, even a small sheet resistance value is about several ten Ω/□. To obtain a resistance of 100Ω or less by one resistive element, the number of sheets for forming resistive elements decreases, the sheet widens, and the resistive element area increases for high-precision design.

In the third embodiment, the resistances R1 to R3 are higher and the number of sheets are larger, compared to the first embodiment. However, the resistances can be designed at higher precision without increasing the resistive element area. Note that the third embodiment may be applied to the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-290660 filed on Dec. 27, 2010 and 2011-269398 filed on Dec. 8, 2011, which are hereby incorporated by reference herein in their entirety.

What is claimed is:

1. A printhead manufacturing method comprising the steps of:

preparing a printing element substrate including a receiver, first and second input pads, and a plurality of selection pads, the receiver includes a first terminal and a second terminal which receive a first signal and a second signal, respectively, the first input pad is connected to the first terminal and externally receives the first signal, the second input pad is connected to the second terminal and externally receives the second signal, and the plurality of selection pads is connected to the second terminal via at least two resistive elements out of a plurality of resistive elements to selectively obtain one of plural combined resistances that differ from each other;

preparing a head substrate including a first transmission line and a second transmission line, the first transmission line transmits the first signal, and the second transmission line transmits the second signal;

selecting at least one of the plurality of selection pads to be connected to the first transmission line to obtain a value of the one of the plural combined resistances; and connecting the at least one of the plurality of selection pads selected in the selection step and the first transmission line, connecting the first input pad and the first transmission line, and connecting the second input pad and the second transmission line.

2. A printhead manufacturing method comprising the steps of:

preparing a printing element substrate including a receiver, first and second input pads, and a plurality of selection pads, the receiver includes a first terminal and a second terminal which receive a first signal and a second signal, respectively, the first input pad is connected to the first terminal and externally receives the first signal, the second input pad is connected to the second terminal and externally receives the second signal, and the plurality of selection pads is connected to the second terminal via at least two resistive elements out of a plurality of resistive elements to selectively obtain one of plural combined resistances that differ from each other;

preparing a plurality of head substrates each including a first transmission line, a second transmission line, a first connection pad, a second connection pad, and a plurality of connection selection pads, the first transmission line transmits the first signal, the first connection pad is connected to the first transmission line and corresponds to the first input pad, the second transmission line transmits the second signal, the second connection pad is connected to the second transmission line and corresponds to the second input pad, the plurality of connection selection pads correspond to the plurality of selection pads, and the plurality of head substrates have different connection patterns of the plurality of connection selection pads and the first transmission line;

selecting one of the plurality of head substrates to obtain a value of the one of the plural combined resistances; and connecting the printing element substrate and the selected head substrate.

3. The method according to claim 1, wherein resistances of the plurality of resistive elements are set to make partial regions of profiles of the combined resistances overlap partial regions of profiles of adjacent combined resistances when a plurality of printing element substrates are manufactured and combined resistances of the printing element substrates are plotted.

* * * * *